May 30, 1933.   E. P. SACREY   1,911,471
COOLING FAN FOR ELECTRIC MOTOR OPERATED TOOLS
Filed Dec. 12, 1930
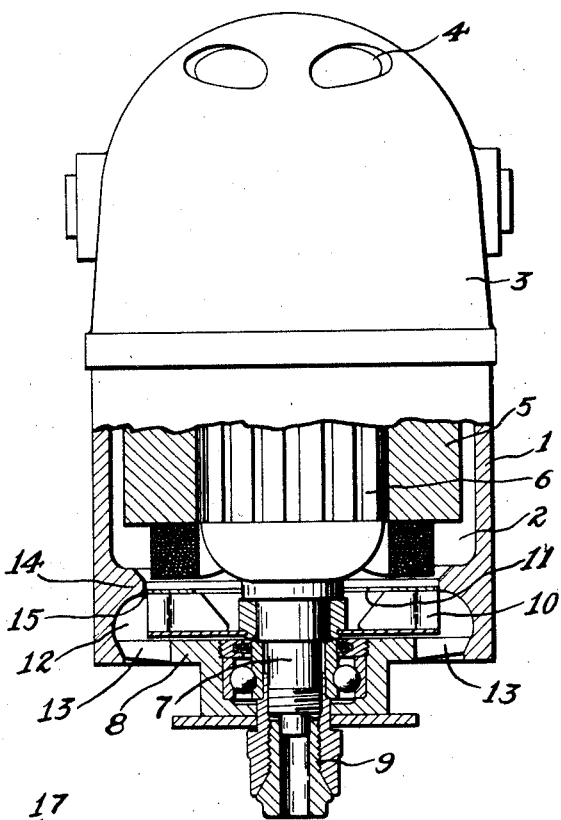
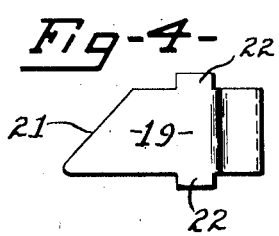
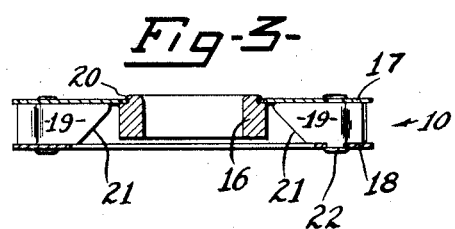
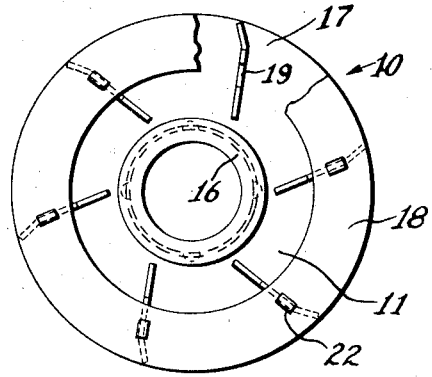

Patented May 30, 1933

1,911,471

UNITED STATES PATENT OFFICE

ELMER P. SACREY, OF LIVERPOOL, NEW YORK

COOLING FAN FOR ELECTRIC MOTOR OPERATED TOOLS

Application filed December 12, 1930. Serial No. 501,903.

This invention relates in general to portable motor driven tools, instruments, apparatus and the like and has for its object a particularly simple and highly efficient construction and arrangement of parts whereby the motor is adequately cooled under all conditions of service.

In the recent design in late years the demand for motor driven portable tools for production work has steadily increased. To meet this demand, designers have found that the universal motor and the high frequency induction motor are best adapted for such tools. These motors have, however, certain characteristics that present serious problems to the designer. Such characteristics are that these motors run at very high speed ranging from about 1200 R. P. M. under full load to 20,000 revolutions running light. These motors are also quick starting and quick accelerating, and it is these characteristics that make them especially useful in heavy production, but these characteristics also cause the motors to become quickly overheated if overloaded, stalled or run continuously under full load for any appreciable length of time. Different methods of construction have been developed to prevent these motors from overheating, but insofar as applicant is aware, none of these constructions produces the desired result.

The invention consists in the novel features and in the combinations and constructions hereinafter set forth and claimed.

In describing this invention, reference is had to the accompanying drawing in which like characters designate corresponding parts in all the views.

Figure 1 is an elevation, partly broken away, of a motor driven tool embodying my invention.

Figure 2 is a face view, partly broken away, of the fan.

Figure 3 is a sectional view taken diametrically of Figure 2.

Figures 4 and 5 are respectively, a plan view, and edge view of one of the blades of the fan.

This invention comprises generally, a casing of a motor driven tool having a compartment in which the motor is located, the casing having air inlets at one end, for convenience referred to herein as its upper or outer end, a tool mounted on the rotor of the motor, or the shaft thereof, and extending beyond the other, or lower end wall of the casing, a centrifugal fan mounted on the rotor or the shaft thereof adjacent the motor, or between the motor and the tool, or between the motor and the lower wall of the casing, the inlet side of the centrifugal fan being presented toward the motor, and the casing having outlet openings for receiving the air discharged centrifugally from the fan, the outlet openings being arranged to blow the chips created by the tool away from the work.

Fans have heretofore been used to cool motors and blow away the dust or chips, but the fans heretofore used, because of their construction and relative arrangement, have not created a sufficient air current to cool the motor under all conditions.

1 designates the casing of a motor driven tool having a motor compartment 2, and a cap 3 at its outer or upper end provided with air inlet openings 4. The motor is the usual type having the usual stationary field magnets 5, and rotor 6 suitably mounted in the compartment 2, the armature or rotor 6 having its shaft 7 extending through the lower end wall 8 of the housing, where a tool holder 9 is coupled thereto, and preferably in alinement therewith, in any suitable manner. The bearing or mounting of the motor and its shaft in the casing, forms no part of this invention.

10 designates a centrifugal fan mounted on the shaft 7 within the casing adjacent the lower wall 8 of the casing, this fan having its inlet opening 11 presented toward the motor, and discharging centrifugally into a channel 12 formed in the lower end of the housing, which channel is provided with a series of outlet openings 13 in the wall 8, and arranged to direct the outgoing air current against the work adjacent the tool to blow away the dust and chips created by the tool. The channel 12 is separated from the compartment 2 by an inwardly extending annular wall 14, with its inner edge 15 adjacent the periphery of the top plate of the fan so that there is only clearance enough between it and the fan to provide free running movement of the fan. This annular wall 14 provides a seal between the compartment 2 and the channel 12 so that the air discharged from the fan cannot pass from the channel 12 into the compartment 2 and be pumped over again by the fan. That is the fan must draw all of its air from the compartment 2.

The fan here illustrated comprises a hub 16 mounted on the shaft 7, a discoidal back plate 17 mounted on one end of the hub and an annular front plate 18, and blades 19 secured between the plates. The back plate 17 is located adjacent the lower wall 8 of the housing or casing and the annular plate 18, toward the motor, the annular plate confining the inlet 11 of the fan. The hub 16 projects from the back plate and its periphery is opposed to the inner edges of the blades 19. As here shown, the hub is provided with an annular groove which receives the inner margin or edge of the back plate 17 and the hub is secured as at 20 to the back plate by spinning or riveting operation.

The inner edges 21 of the blades 19, that is, the edges of the blades toward the open or suction side of the fan incline rearwardly or toward the plate 17 from a point adjacent the inner edge of the plate 18, or converge toward the hub from near the inner edges of the annular plate 18 rearwardly toward the hub. These blades are not arranged radial but slightly tangential. The blades are provided with elongated ears or lugs 22 on their sides which fit elongated slots in the plates 17, 18 and their ends are riveted to hold the parts assembled. The outer portions of the blades extend at a slight angle to the main portion of the blades. This outer end portion constitutes about one-fourth of the length of the blade and extends backward or opposite the direction of rotation. The inner portions of the blades are tapered as described in order to present a straight surface to the air being drawn into the fan in order to prevent the fan from forming a pocket in the air and running in its own vacuum, thus producing or creating no current of air as would be the case if the inner portions of the blades were formed square with the corners projecting toward the open side of the fan. The outer bent portions of the fan provide means for efficiently discharging the air from the fan by giving it somewhat of a centrifugal action as it leaves the same. It is the design and construction of the fan and the adjacent portions of the casing 1 that add greatly to the efficiency to the cooling system.

In operation, the tapered inward extensions of the blades facilitate greatly the drawing in of the air through the inlets 4 around the parts of the motor and owing to the location of the annular flange 14 relative to the fan, the air is only drawn into the fan from the casing 2. This construction creates ample air current under all conditions to cool the motor and if desirable to remove the chips or waste material created by the tool operated by the motor.

What I claim is:

The combination of an electric motor, a housing therefor, the motor being mounted in the housing and including a field and a rotor with air passages extending lengthwise of the outer side of the field and an air gap between the rotor and field, the housing having an air inlet on one side of the motor and air outlets on the other side, the motor shaft extending through the outlet end of the housing, a centrifugal fan mounted on the motor shaft at the outlet end of the housing, the housing having an annular chamber around the fan, the outlet leading from the chamber throughout the entire side of the chamber and the fan having a central inlet around the shaft and presented toward the motor, the other side of the fan being closed and centrifugal outlets discharging into the annular chamber and the fan having an annular marginal wall adjacent to and spaced from the field of the motor, whereby the air is drawn by the fan through the inlet passages around the field and the air gap and into the central opening of the fan and discharged from the fan throughout the entire periphery of the fan.

In testimony whereof, I have hereunto signed my name, at Syracuse, in the county of Onondaga, and State of New York, this 8th day of December, 1930.

ELMER P. SACREY.